United States Patent Office

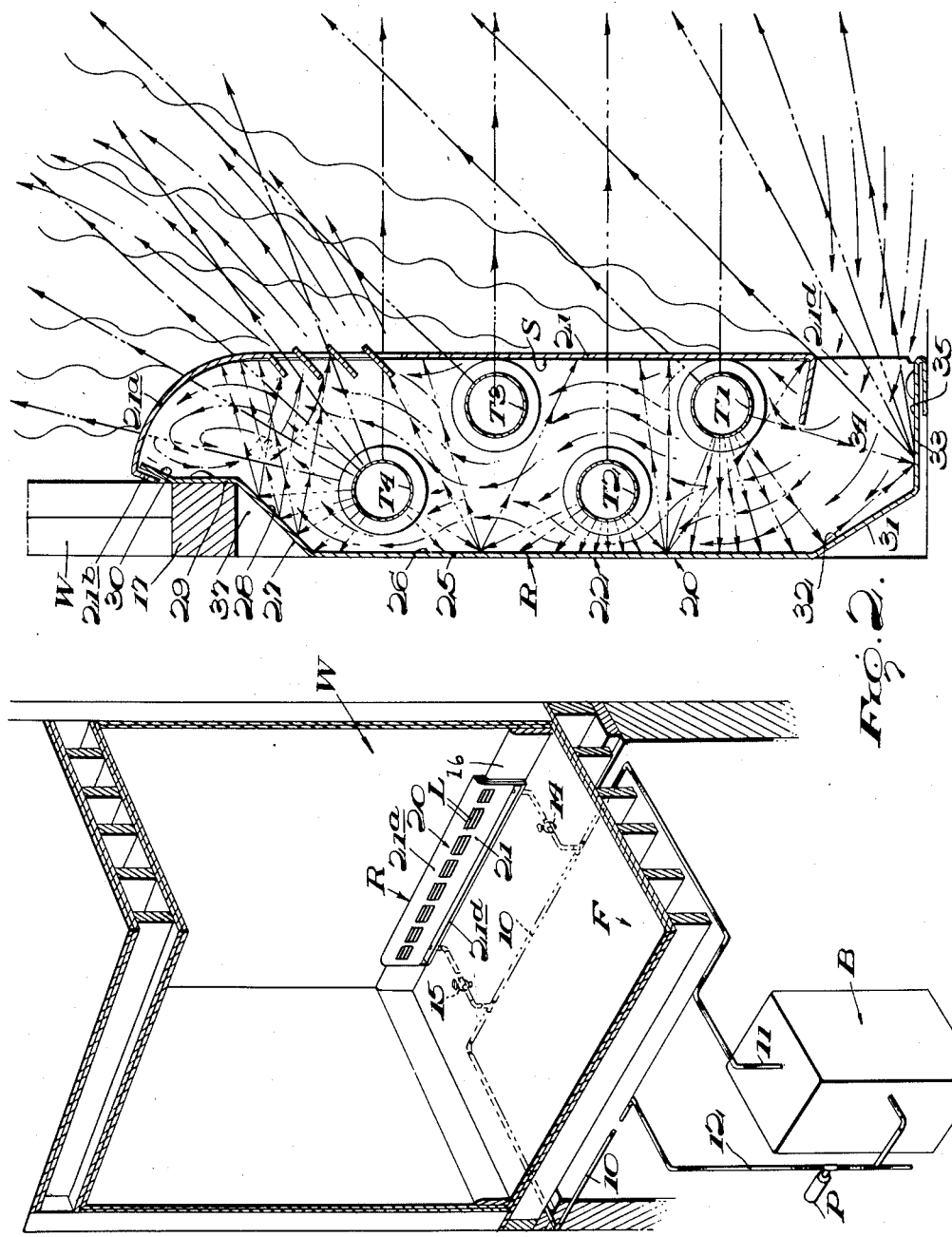

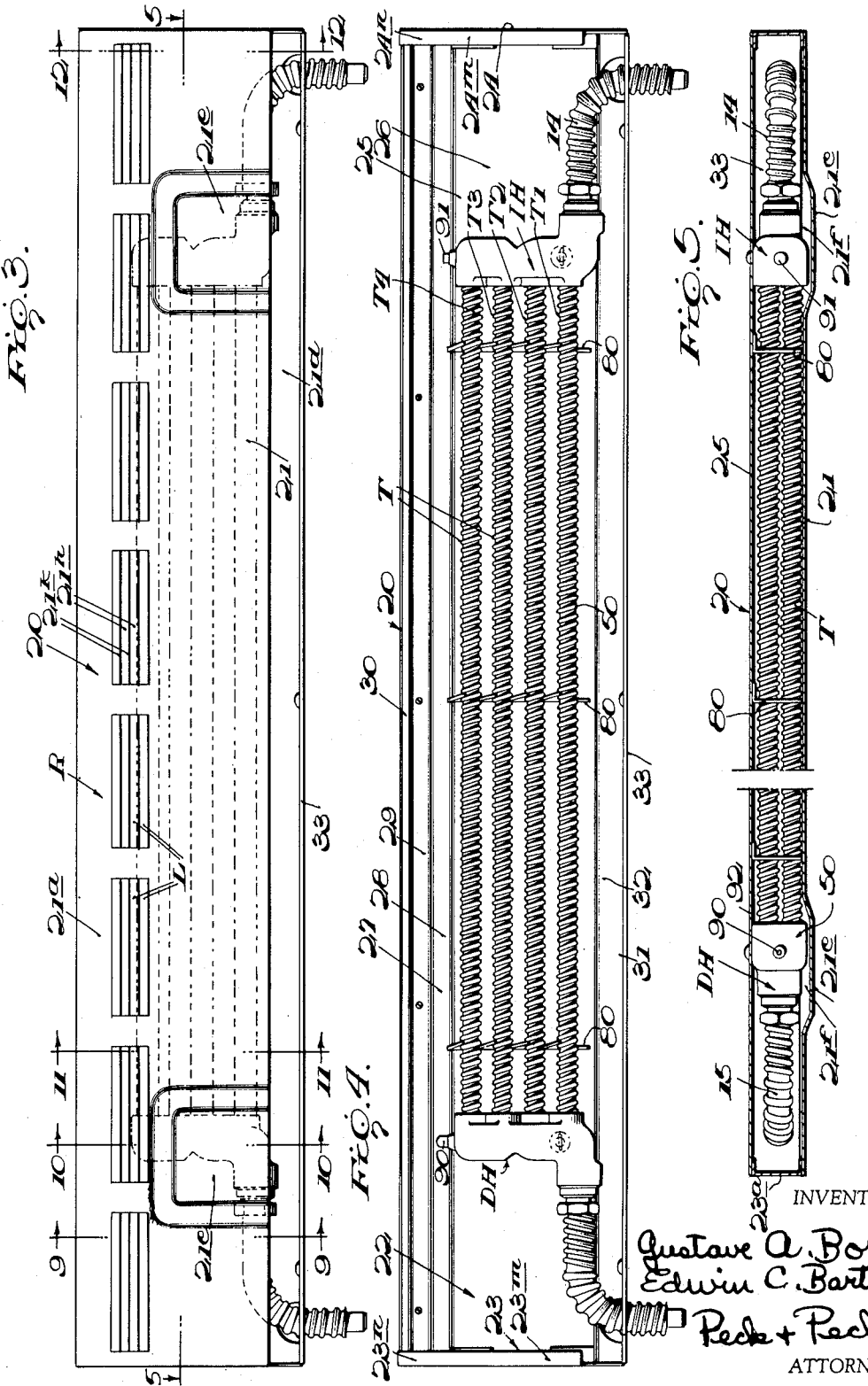

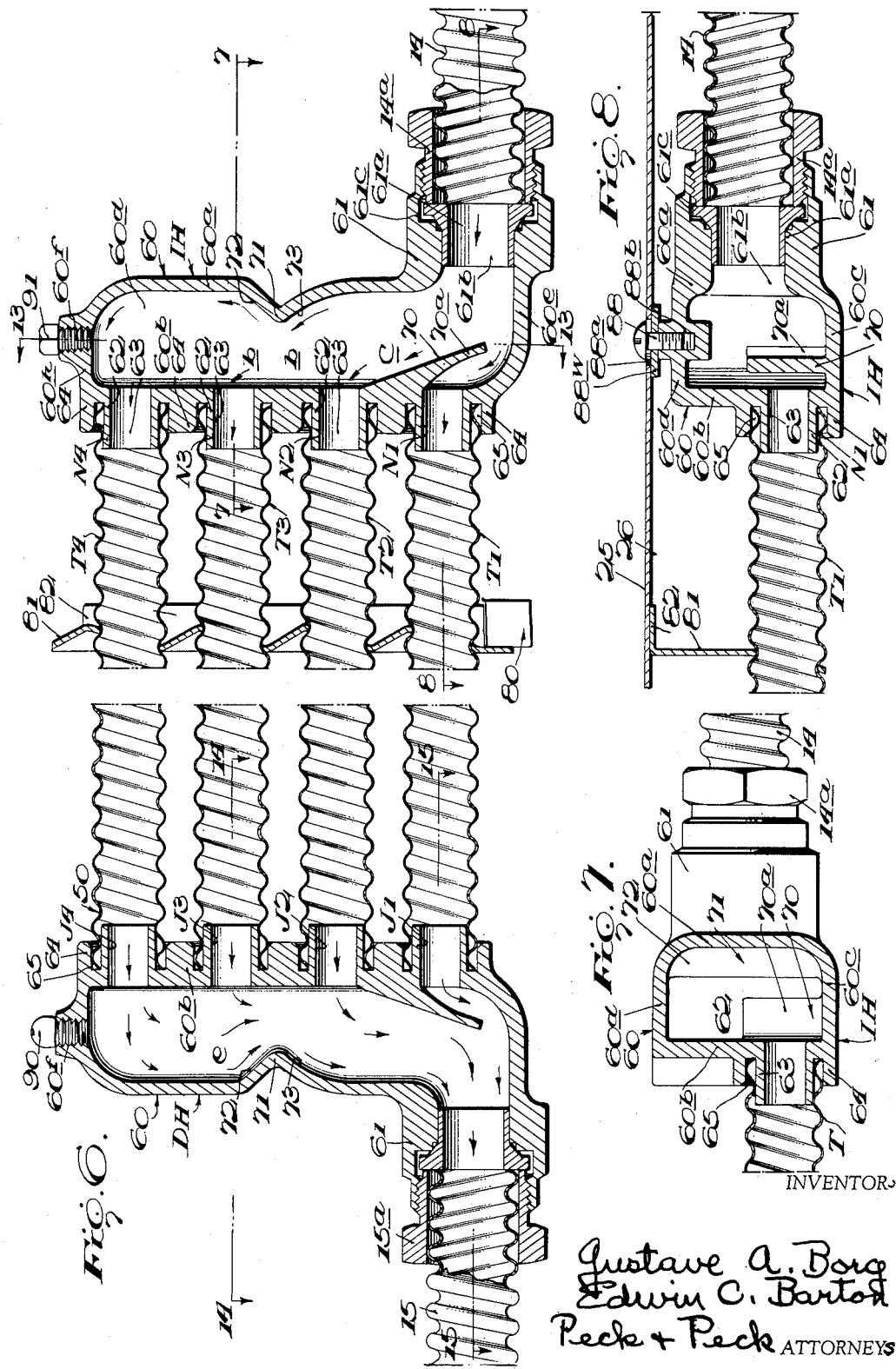

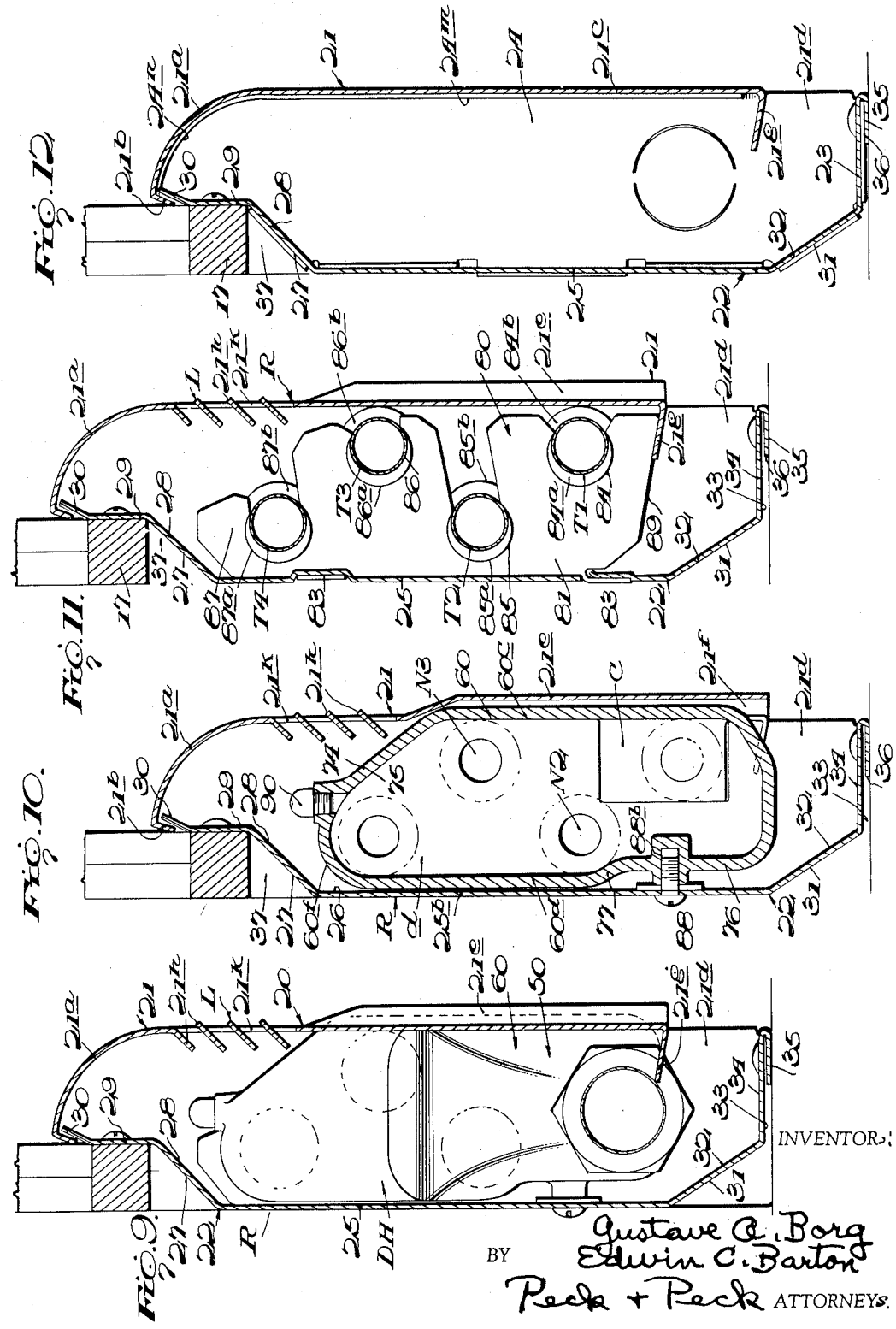

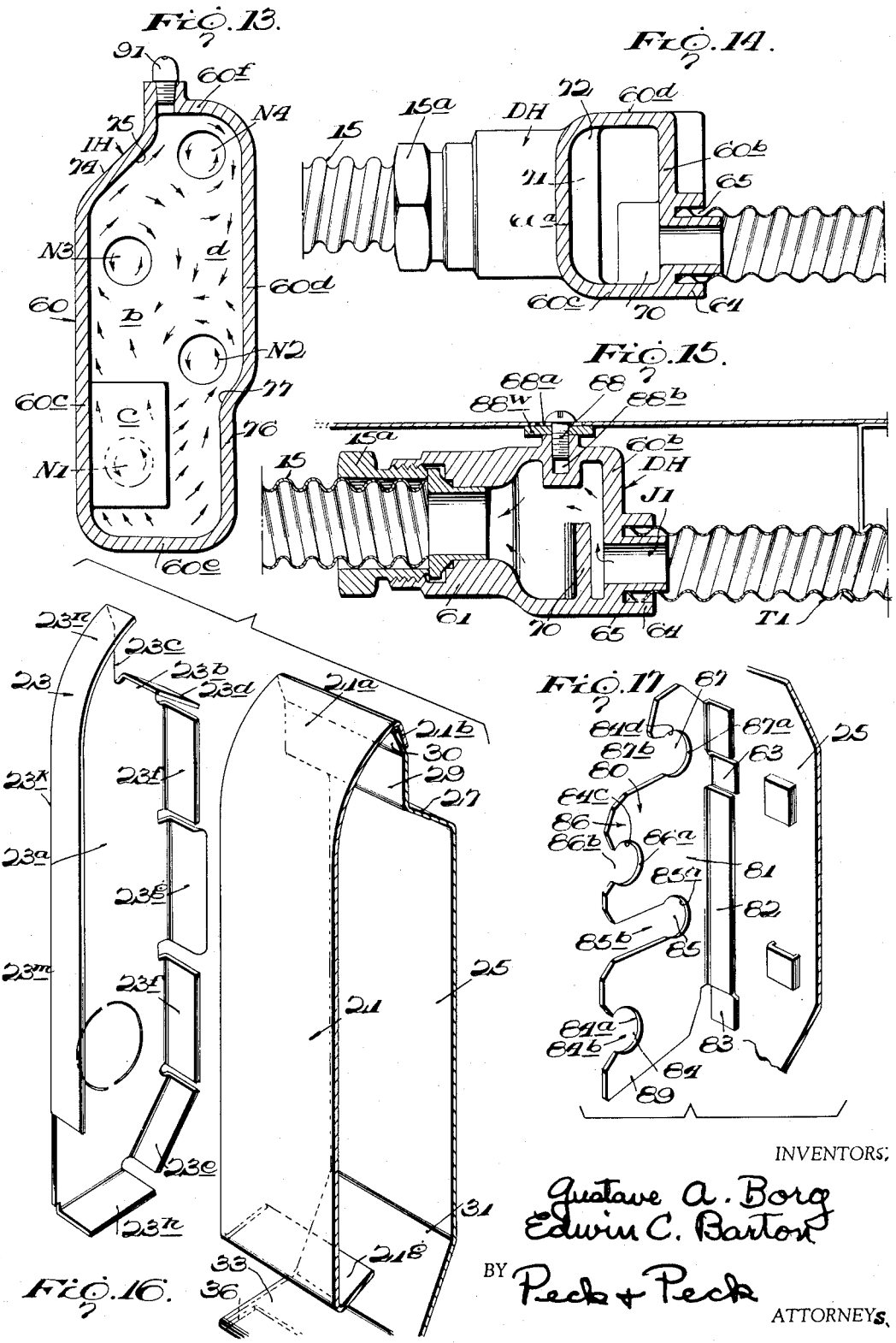

2,731,242
Patented Jan. 17, 1956

---

2,731,242

RADIANT HEATING SYSTEMS AND APPARATUS THEREFOR

Gustave Adolph Borg, Watertown, Conn., and Edwin C. Barton, Tuckahoe, N. Y., assignors to Turbo-Ray, Inc., New Rochelle, N. Y., a corporation of New York Application May 1, 1951, Serial No. 223,978

3 Claims. (Cl. 257—133)

This invention relates to radiant heating systems and apparatus therefor; and the nature and objects of the invention will be readily recognized and understood by those skilled in the arts involved in the light of the following explanation and detailed description of preferred embodiments or mechanical and thermodynamic expressions of our invention, from among various other embodiments, expressions, forms, designs, constructions and combinations of which a system and the apparatus therefor of the invention are capable within the broad spirit and scope thereof as defined by the appended claims.

The invention is particularly concerned with and directed to the generation and emission and the directional distribution and control of radiant energy for the purpose of supplying heat to the enclosing walls of and to the objects in an enclosed space or room; and a general object of the invention is to provide an improved design and arrangement of radiant heating system and of the radiant energy distributing units thereof by which a more effective and efficient emission and utilization of the radiant energy rays for room and occupant heating may be carried out within practical limitations of cost and of building design and construction.

A further and an important object of the invention is to provide a design and construction of radiant heating unit by which there is obtained in the operation thereof a functioning of the unit to supply heat to a room through a balanced heat transmission by radiation, by convection and by conduction.

It has been determined that if floor level temperatures are increased in a room there is thereby destroyed one of the basic factors that cause the generation of the relatively strong, high velocity convection currents characteristic of conventional convection type heating systems, as well as many other types of systems including those utilizing so-called "base-panel" heaters or radiators. It is an object of our invention to provide a design of base-panel type radiant heater by which effective radiant heating of the air in a room along and over the floor level thereof may be obtained to thereby substantially eliminate the creation of strong high velocity convection currents in the room and to establish and maintain gentle, low velocity convection currents for transmitting heat to the room in correlated and balanced relation with the heat being supplied to the room by radiation.

A feature resides in the provision of a system for warming a room and for maintaining the occupants thereof healthfully warm and comfortable by transmission of heat by convection together with a correlated transmission of heat by radiation through an efficient utilization of radiant energy in the form of radiant rays projected in a primary concentration through the air in the room at and over the floor level thereof, with a further distribution of radiant rays efficiently throughout the air in the room above the air receiving the primary radiation along the floor level.

Another object is to provide such a system by which the air in the room may be maintained at relatively low temperatures by a combined transmission of heat thereto by radiation and by convection and conduction in a correlated relationship in order to supply to the body of an occupant by both heat release from radiant rays and from warmed air, any excess of heat loss above normal for the body to thereby maintain an occupant in a state of healthy and comfortable warmth without excessively high heating of the air within the room.

A further object is to provide such a heating system and such a design and arrangement of heating unit components thereof which will so function as to heat and maintain a constant uniformity of temperature of the air in a room which will vary by only a few degrees throughout the entire room.

Another object is to provide such a system in which the various components thereof are of relatively simple mechanical design and construction capable of installation, maintenance and operation at relatively low costs.

A further object is to provide such a system which may efficiently utilize as components thereof conventional heating boilers for supplying the fluid heating medium to the radiant ray emitting units of the system.

Another feature of the invention resides in the provision of a design of radiant heating units having the above general characteristics and functioning, which will be capable of ready installation in a building under construction or in a finished building, and which may be readily coupled into the fluid heating medium circulating pipe lines of a conventional heating system, installed or to be installed in a building, without the necessity of major rearrangement or additions to such pipe lines.

A further object is to provide a heating unit for effecting heat transmission by radiation, convection or conduction, of a design adapted to be mounted in position at and along the baseboard area of an enclosing wall of a room to occupy a minimum of useful space in the room but to efficiently distribute and control the radiant rays and convection transmission of heat therefrom to the room; and in carrying out this object the invention is featured by an efficient arrangement of radiant ray reflecting and absorbing surfaces and of convection current establishing and controlling air passages in and through the unit.

An important feature of our invention resides in the provision in such a unit of very thin-walled tubes of high emissivity characteristics through which a fluid heating medium, such as hot water, may be circulated for maximum radiant ray emission from such tubes; and a further feature in connection with such tubes is found in the provision for circulation of fluid heating medium through the tubes in vortical paths and with turbulence, so as to eliminate or reduce the so-called "film co-efficient" effect encountered with fluid flow through a tube.

Another object is to provide a radiant heating unit which will function automatically upon initiation of heating operation thereof to instantly emit radiant rays therefrom and to simultaneously establish strong, high velocity convection currents for an interval of time, and to thereafter dampen and reduce automatically the strong, high velocity convection currents to gentle, low velocity currents and to maintain such low velocity currents for transmission of heat in a balanced or stabilized relationship with the transmission of heat by radiation from the unit.

A further object is to provide an improved design of supply header and of discharge header for connecting a plurality of fluid circulating tubes for obtaining efficient flow distribution into and from the tubes.

Another feature of the invention resides in the provision of such a radiant heating unit in which the fluid heating medium conducting tubes and the headers connected thereto are removably mounted as a unit in an enclosing cabinet by a non-rigid, "floating" suspension which permits of expansion and contraction of the tubes and resulting movements thereof independently of the enclosing cabinet.

Another object is to provide an enclosing cabinet for such a radiant heating unit, which will be of simple, relatively inexpensive construction and of minimum thickness and height dimensions, with the walls thereof being utilized to provide radiant ray reflecting surfaces for controlling the rays projected therefrom.

Another object is to provide an enclosing cabinet for such a radiant heating unit of a design to effect circulation of air therethrough to effect transmission of heat by convection in a correlated relationship with the transmission of heat by radiation from the unit.

A further object is to provide such a cabinet with the forward or front wall thereof readily removable and replaceable for access to the transmitter or generator tube unit within the cabinet; and further to removably mount the tube unit within the cabinet for removal and replacement thereof from the cabinet.

A further object is to so design, arrange and mount the cabinet front wall relative to the transmitter tube unit that the front wall will be in direct contact with and against at least some of the transmitter tubes for transmission of heat by conduction directly to the entire area of such front wall.

And a further object is to mount the transmitter tube unit insulated from the cabinet rear wall while maintaining a substantially unbroken air circulation space between the rear wall and tube unit.

With the foregoing and various other objects, features and results in view, which others will be apparent from the following detailed description and explanation of the selected examples of the invention herein disclosed, our invention consists in certain novel features in design and construction of parts and components, and in combinations and sub-combinations thereof, all as will be more fully referred to and specified hereinafter.

Referring to the accompanying drawings in which similar reference characters refer to corresponding parts and elements throughout the several figures thereof;

Fig. 1 is a more or less schematic view in perspective of a portion of the floor, walls and ceiling of a room with a heating unit of the invention mounted and installed in position at the baseboard area of a wall of the room, a hot water boiler and water circulating line being schematically shown in operative connection with said generating unit.

Fig. 2 is a view in vertical transverse section through the unit of the example of Fig. 1, indicating schematically by systems of arrows the radiant ray projection and the convective circulation, the conductive heat transmission being indicated by wave lines.

Fig. 3 is a view in front elevation of the heating unit of Fig. 1.

Fig. 4 is a view in front elevation of the unit of Fig. 3 with the front panel removed and showing the transmitter tube unit in mounted position within the cabinet structure.

Fig. 5 is a horizontal, longitudinal section through the heating unit, taken as on the line 5—5 of Fig. 3.

Fig. 6 is a vertical, longitudinal section through the transmitter tube and header unit of the heating unit of Fig. 3, showing by arrows the paths of flow of the heating fluid through the intake header, spirally corrugated transmitter tubes, and the discharge header.

Fig. 7 is a detail horizontal section through the intake header, taken as on the line 7—7 of Fig. 6.

Fig. 8 is a detail horizontal section through the intake header, taken as on the line 8—8 of Fig. 6.

Fig. 9 is a vertical, transverse section through the heating unit taken as on the line 9—9 of Fig. 3, and showing the discharge header of the tube unit in end elevation.

Fig. 10 is a vertical, transverse section taken as on the line 10—10 of Fig. 3, and showing the discharge header in vertical, transverse section.

Fig. 11 is a vertical, transverse section taken as on the line 11—11 of Fig. 3, and showing particularly one of the transmitter tube unit mounting brackets with the tubes in mounted position therein.

Fig. 12 is a vertical, transverse section taken as on the line 12—12 of Fig. 3, and showing a casing end cover in side elevation in mounted position thereon forming a friction-joint with the cabinet.

Fig. 13 is a vertical sectional view through the intake header, taken as on the line 13—13 of Fig. 6, the flow distribution being indicated schematically by arrows.

Fig. 14 is a detail horizontal section through the discharge header, taken as on the line 14—14 of Fig. 6.

Fig. 15 is a detail horizontal section through the discharge header, taken as on the line 15—15 of Fig. 6.

Fig. 16 is a perspective view of the left end cover and adjacent casing end with which it forms a friction-joint, the end cover being shown separated from the casing.

Fig. 17 is a perspective view of one of the tube unit-mounting brackets, the bracket being shown separated from the cabinet rear wall structure.

We have selected and have disclosed and explained herein as one possible example of our invention of a radiant heating system of the one-pipe, forced circulation, hot water type into which is connected a radiant heating unit embodying our invention of a form adapted for operation with hot water. In the system of the example, a heating unit R of our invention is mounted and installed in a suitable location at the baseboard area along one side wall W of a room as shown in Fig. 1. This unit R of the example is of the hot water type and is connected into the pipe line 10 of a one-pipe, forced circulation hot water system which includes the boiler B and the circulating pump P. This pipe line 10 forms a closed circuit, in the more or less conventional manner, with its intake end section 11 receiving hot water from boiler B and its discharge or return end section 12 returning water to the boiler for reheating and recirculation. The circulating pump P is in this instance mounted in the return section 12 of pipe line 10 and is suitably power driven, as by an electric motor for forcing hot water from boiler B through pipe line 10 and the unit R, and back to the boiler by way of the return or discharge section 12 of the pipe line.

The pipe line 10, as is usual, may be positioned below the floor F and adjacent the baseboard area of wall W, and in accordance with our invention, an intake or supply line 14 of the flexible metal hose or tube type connects pipe line 10 with the intake end of transmitter unit R, while a return line 15 in the form of a flexible metal hose or tube connects the discharge end of unit R with the pipe line 10. There is thus established a closed continuous flow circuit from pipeline 10 through flexible intake or riser hose 14, through unit R and thence back to line 10 by the flexible return hose or tube 15. In a building having a plurality of rooms or wall enclosed spaces a unit R, or a plurality of such units, may be installed in position at the baseboard section or area of an enclosing wall or walls of any such room or rooms which it may be desired to warm by irradiation, and, as with the system of the example, such additional unit or units R would be connected into the line 10 by flexible tube intake or risers 14 and flexible discharge lines or tubes 15 in the same manner as that shown for the unit R installed at the baseboard section of wall 10 in Fig. 1. Hence, it is not deemed necessary to herein illustrate or describe each such additional unit and its connection into a hot water circulating line 10.

The selected example of one-pipe hot water system with which the radiant ray transmiting and distributing unit or units R may be combined to make up a radiant heating system of our invention, is not presented by way of limitation in all respects but primarily as an exemplification of one possible type of operative system embodying the principles and features of our invention. If desired or found expedient, other types of systems using fluid heating mediums may be employed, such, for example, as a reverse return system of the forced circulation, hot water type in which a supply line from a hot water boiler supplies hot water to a unit or units R through the intake tube or risers 14 thereof, and a separate return flow line which is connected with the discharge sides of the units through return tubes 15, returns the hot water from the units back to the boiler. As such a reverse flow, two-pipe system for hot water circulation is familiar to those working in this art, it is not deemed necessary to illustrate herein such a system.

Following one of the basic principles of our invention, a radiant ray transmitting and distributing unit R is designed for mounting and installation at and along the baseboard area of an enclosing wall of a room, such as wall W of Fig. 1. A unit R of this base-panel form of our invention is characterized by a relatively great length to depth ratio and also by a relatively great length to thickness ratio. For instance, a unit R may preferably have, as in the example form thereof here presented, an over-all thickness of approximately 2", with an over-all height or vertical dimension of approximately 8⅜", while the length of a unit may vary from approximately 3' up to approximately 10' or more, as may be desired or found expendient under the particular conditions and circumstances of an installation. However, we have found that for average installations in dwellings, apartments, offices and the like, units having lengths of approximately 10' will meet the normal, maximum length requirements. With a unit R so dimensioned as to thickness and height, the unit has the general thickness and height dimensions of a conventional baseboard, and may be mounted and installed in position as shown in Fig. 1, along the baseboard area of a wall, such as wall W, to form in effect a section or portion of a baseboard 16 for the room. Thus, a base-panel unit R when mounted and installed does not occupy aprpeciably any more useful space in a room than does a conventional baseboard, while the unit presents a smooth, relatively flat outer or front surface of a character which will offer no interference and which will not detract from but rather will add to the appearance of the room.

A radiant ray transmission and distributing unit R embodying our invention, is in this example essentially comprised of a cabinet or casing 20 which includes the removable front wall panel or grill 21, with a fluid heating medium circulating and radiant ray emitting tube unit 50 mounted and enclosed therewithin. The cabinet unit 20 and the tube unit 50 are so designed and constructed and so combined and associated in assembled relation, that the tube unit 50 will emit radiant rays generated by the circulation of hot water therethrough, while the cabinet 20 will efficiently, directionally control the projection and distribution of the emitted rays from the unit R through the room in which the unit is mounted. With a unit R of the baseboard-panel type mounted and installed at the baseboard area with the lower side of the unit substantially at the floor line or level of a room, the design and arrangement is such that radiant rays are projected therefrom directly across the floor and upwardly therefrom in outwardly and upwardly diverging paths through an arc of approximately 90°, so that these rays are projected substantially throughout the room toward the opposite wall and upwardly toward and across the ceiling of the room, as clearly indicated schematically by the arrows in Fig. 2, to which detailed reference will be hereinafter made.

The cabinet or casing unit 20, referring now to Figs. 3 through 12, includes a shell, preferably formed of sheet aluminum, to provide a back or rear wall structure 22, the opposite end wall structures or end covers 23 and 24, and the lower or bottom wall 33. This casing or shell thus presents an open forward side which is normally closed by the vertically disposed front wall panel or grill 21 removably mounted thereon to complete the cabinet.

The rear wall structure 22 of the cabinet unit 20 includes the major rear wall portion or center panel 25 which in mounted and installed position of the unit R of the example is disposed in a vertical plane and extends longitudinally of structure 22 from end to end thereof. The entire area of wall section panel 25 at the forward side thereof is formed to provide a bright metal reflecting surface 26, which may if desired be highly polished. The rear wall structure 22 also provides a forwardly and upwardly inclined section or panel 27 which extends from and along the upper side of major wall section 25 in integral continuation thereof. The entire area of the front or forward side of this inclined panel section 27 is formed to provide a bright metal reflecting surface 28, which may be highly polished if desired. The inclined panel section 27 of rear wall structure 22 has as an integral upward extension thereof, a section or mounting panel 29 which is disposed in a vertical plane substantially parallel with the plane of the major wall section 25 and which has its upper edge portion throughout the length thereof bent or inclined forwardly to provide the flange section 30 which forms a seating flange for the upper longitudinal edge portion of the front wall panel or grill 21. The forward or front sides of panel 29 and of upper flange section 30 thereof may also present bright metal reflecting surfaces, although as will be hereinafter pointed out, such surfaces do not function primarily as reflecting surfaces, as do the surfaces 26 and 28.

At and along the lower side of major wall section 25 of wall structure 22, there is formed and provided in integral continuation thereof the forwardly and downwardly inclined wall panel section 31 which joins with a horizontally disposed forwardly extended section or panel 33 integral therewith and which provides the lower or bottom wall of the cabinet unit 20. The forwardly and downwardly inclined panel section 31 has the entire area at the front or forward side thereof formed to present a bright metal reflecting surface 32 which if desired may be highly polished. Similarly the upper side of the cabinet bottom wall 33 has the entire area thereof formed to provide a bright metal reflecting surface 34 which may be highly polished. In this example, the bottom wall 33 may be formed with a flange 35 along the forward or front edge portion thereof which is bent or folded over into position along and upwardly against the under side of the bottom wall. Flange 35 has a width less than the width of the bottom wall and provides with wall 33 at the opposite ends thereof, the slots 36 for receiving mounting members of the opposite end wall structure or covers 23 and 24, respectively, as will be described hereinafter in detail.

In the unit R of the selected example, the upper reflecting panel 27 is formed as a flat panel at an angle to major panel 25, and the lower reflecting panel 31 is also formed as a flat panel at an angle to panel 25. We contemplate and include the formation of each of the panel portions 27 and 31, or either of them, on a radius to provide concave-convex panels presenting at the forward sides thereof concave reflecting surfaces. In such formation, panel 27 is curved upwardly and forwardly, while panel 31 is curved downwardly and forwardly to thus direct and distribute the radiant rays projected thereagainst in directions generally corresponding to the distribution effected by the flat, planar reflecting surfaces of the angular forms of the illustrated example.

It will be noted by reference to Figs. 9 through 12, that the bottom wall 33 of the cabinet unit 20 has a width such that it is projected outwardly beyond and with its forward edge lying in a vertical plane spaced forwardly from the vertical plane passing through the forward edge of the upper side flange 30. It will be further noted that by the construction and arrangement of the rear wall structure 22 which includes the forwardly inclined section or panel 27 with the vertically upwardly disposed section or panel 29 which terminates in the forwardly bent upper edge flange 30, there is thus formed at and along the rear, upper side of the cabinet from end to end thereof, the set-back or re-entrant portion which provides a space 37. This rear side space or recess 37 permits of the location therein of the ground 17 on stud line of a wall W to and along which the vertical panel or section 29 of the cabinet unit may be attached to position the cabinet with that portion of the body thereof that is below vertical panel section inset within wall W. However, a unit R may be installed in position directly against the plaster of a finished wall, in relatively same manner as wooden baseboards.

The right and left end wall structures or end covers 23 and 24 are designed and constructed to form friction-joints with their respective ends of the cabinet unit, so that they may be readily assembled and disassembled as "snap-on" units. These covers 23 and 24 are identical in structure except for reverse positioning of the components thereof to thereby form a right hand cover and a left hand cover.

The end wall structure or cover 23 at the left hand end of the cabinet unit 20 will now be described in detail, and such description will also serve as a detailed description for the opposite end cover 24 which is identical with cover 23 but with the corresponding components thereof in reversed positions. Referring to Figs. 4 and 16, cover 23 includes the body wall 23a which in mounted position of the cover extends over and across and closes the left hand end of the cabinet structure with this wall being disposed in a plane generally perpendicular to the plane of the major panel 25 of rear wall structure 22. The body wall 23a has the upper rear portion thereof cut out to provide a rearwardly and upwardly open recess defined by the upwardly and forwardly inclined or sloping edge portion 23b and the vertical edge portion 23c in upward continuation of the edge portion 23b. The inclined edge portion 23b has an integral tongue or tab 23d bent inwardly therefrom into position in a plane inclined upwardly and forwardly at the same angle as the angle of inclination of the rear wall panel 27. The lower rear portion of body wall 23a has the rear edge thereof inclined forwardly and downwardly and a tab or tongue 23e is bent up therefrom into position disposed in a plane inclined forwardly and downwardly at the same angle of inclination as the angle of inclination of rear wall panel 31 of wall structure 22. Intermediate the upper tab 23d and the lower tab 23e, the vertical edge portion of body wall 23 has the vertically spaced tabs 23f bent up therefrom into positions disposed in a common vertical plane extended inwardly from the body wall. An intermediate tab 23g is bent up from body wall 23a between tabs 23f in position in a vertically disposed plane laterally offset rearwardly from the vertical plane of the tabs 23f. At the lower end of body wall 23a, a tab 23h is bent up therefrom into position disposed in a horizontal plane extending inwardly from the body wall.

The forward vertically disposed edge portion 23k of body wall 23a is upwardly and rearwardly curved at its upper end portion and an integral flange 23m is bent up from body wall 23a into position extended inwardly therefrom. This flange 23m terminates at its lower end spaced a distance upwardly from the bottom tab 23h of cover 23. Flange 23m extends upwardly along and follows the curved upper edge portion of the flange to provide the upwardly and rearwardly curved flange portion 23n located at the forward upper side of the cover.

Thus formed and constructed the end cover 23 can be "snapped" into assembled position on the left hand end of the cabinet structure with the tabs bent up therefrom forming a friction-joint with adjacent portions of the casing structure. In mounted position the body wall 23a abuts against the adjacent end edge portions of rear wall structure 22 and bottom wall 33, with the inclined upper tab 23d engaged over the rear side of rear wall panel 27, the vertically spaced tabs 23f engaged over the forward side of major panel 25 of rear wall structure 22 and the intermediate tab 23g engaged over the rear side of panel 25, the lower inclined tab 23e engaged over the rear side of lower inclined panel 31, and the bottom tab 23h slidably received in the slot 36 formed between bottom wall 33 and the inturned bottom wall flange 35 at the adjacent left hand end of the bottom wall. In this manner the end cover 23 is frictionally held in assembled position by the friction joint formed between its tabs and the adjacent portions of the casing structure. The width of end cover 23 is approximately the same as the width of the bottom wall 33, so that, in mounted position of the cover the vertically disposed flange 23m is positioned substantially in the vertical plane passing through the forward edge of the bottom wall 33, with the upper curved portion 23n of flange 23m being positioned extended rearwardly to and engaging over the adjacent upper edge portion of the top flange 30 of rear wall structure 22.

The right hand end wall structure cover 24 is similarly constructed and mounted to form a friction-joint with the casing structure, so that it may be "snapped" to and from assembled position thereon, being held in assembled position frictionally in the same manner as cover 23. This right hand cover 24 includes the forward, vertically disposed flange 24m having the upwardly and rearwardly curved upper end portion 24n, so that, with the end covers 23 and 24 in assembled positions on the opposite ends of the casing structure, these flanges 23m and 24m provide by their forward surfaces seats for receiving and positioning thereon the front wall or grill 21 of the cabinet unit 20.

The cabinet unit 20 is completed by the front panel or grill 21 which is formed of a suitable sheet material, preferably sheet aluminum, such, for example, as that from which the rear wall structure 22 is formed. This front panel 21 has a length approximately equal to the overall length of the cabinet casing with the end covers 23 and 24 in assembled position, and is formed as a generally flat plate or panel. Along its upper side portion front panel 21 is formed on a radius to provide the upwardly and rearwardly curved section 21a which extends from end to end thereof and which terminates along its upper edge in an integral, downwardly turned flange 21b also extending from end to end of the panel. The curved upper side section 21a of panel 21 is formed on a radius which is the same as the radius of curvature of the upper portions 23n and 24n of the flanges 23m and 24m, respectively, of the end covers 23 and 24.

In mounted position, the front panel or grill 21 has the down turned upper edge flange 21b thereof engaged over the forwardly tilted, upper edge flange 30 of the rear wall structure 22, and the opposite end portions of the upwardly and rearwardly curved section 21a of the panel seating on and downwardly over the curved upper end portions 23n and 24n, respectively, of the opposite end covers 23 and 24. The body wall 21c of panel 21 extends down over and across and closes the forward side of the casing structure between the opposite end covers 23 and 24, with the undersides of the opposite end portions of the body wall fitted or seated against the vertically disposed end cover flanges 23m and 24m, as will be clear by reference to Figs. 12 and 16.

The width, that is, the depth in the vertical dimension, of panel 21 when in mounted position as above described, is less than the height of the casing structure so that the lower edge portion of the panel extends across the cabinet from and between the opposite end covers 23 and 24 spaced a distance above the bottom wall 33 of the cabinet structure. There is thus formed an air intake space 21d extending completely across the lower side of the cabinet from end to end thereof and between bottom wall 33 and the lower edge of front panel 21. Adjacent but spaced inwardly from the opposite ends of panel 21, the body wall 21c thereof is formed with the laterally outwardly offset or bulged housing portions 21e to provide at the inner sides thereof within the cabinet, the pockets or recesses 21f for housing therewithin the header components, respectively, of the tube unit 50, in order to permit of the panel engaging against tubes of the tube unit, to which reference will be made hereinafter. These housing bulges 21e extend upwardly a distance along the body wall 21c and terminate spaced below the curved upper section 21a of the front panel. The lower edge of the panel terminates in the integral flange 21g which is bent up therefrom into position disposed inwardly into the cabinet at a preferably upwardly tilted position to form a snap catch element for releasably locking the front panel in position on the cabinet by engagement with the mounting bracket components of the tube unit 50, as will be referred to in detail hereinafter. This flange 21g is preferably interrupted at and across the lower side of each of the housing bulges 21e so as to open the recesses or pockets 21f through the flange at the lower sides thereof for clearance with the header components of the tube unit 50.

The body wall 21c of front panel or grill 21 is provided with a series of sets of louvers L spaced along the body wall from end to end thereof and being located between a line drawn longitudinally of the panel passing through the upper sides of the bulges or housings 21e and the curved upper section 21a of the panel. Each set of louvers L is formed by bending up from the body wall a plurality of horizontally disposed, parallel vanes 21h, in this instance four (4), each of which is inclined upwardly and forwardly so that there are formed therebetween upwardly and forwardly inclined horizontally disposed passages 21k for circulation of warmed air outwardly from the upper portion of the cabinet. Thus constructed, the front panel or grill 21 when in mounted position provides for intake of air into the cabinet unit 20 through the passage between the lower edge flange 21g of panel 21 and the bottom 33 of the casing structure, circulation of such air upwardly through the cabinet over the tube unit 50, and discharge as warmed air from the upper portion of the cabinet outwardly and upwardly to the exterior thereof through the passages 21k between vanes 21h of the louvers L. The use of four (4) vanes 21h and the passages 21k therebetween is not to be considered by way of limitation as any desired number of vanes and passages or openings may be provided to control convective circulation as required or found expedient. Similarly, it is not intended to limit the invention to any particular design or form of louvers, vanes or passages or openings.

With units R of the selected example hereof, we have successfully utilized, both from the standpoint of construction and the standpoint of functioning in use and operation, sheet aluminum for the cabinet structure and front panel or grill thereof, of gauges of the order of .040 to .051. However, we do not consider such gauges to be necessarily critical, and we give them here as an example of a range of sheet aluminum thicknesses for efficient construction and functioning of the particular form of unit embodying our invention of the illustrated example, and, while aluminum may be a preferable material, other material may be employed, if desired or found expedient.

In accordance with our invention we coat the inner surface of the body wall 21c of the front panel 21 with a suitable black coating material which will form and provide a dull black radiant ray absorbing surface S. This surface is formed over the entire area at the inner side of front panel 21 from end to end thereof and from the bottom or lower flange 21g to the louvers L. In this instance, the radiant ray absorbent surface S may be considered to be applied over and covering the inwardly facing, upper sides of the vanes 21h of louvers L, as well as being applied over and covering the upper side surface area of the flange 21g. In this connection, however, it should be pointed out that the application of the coating to form the absorbent surfaces S on the vanes 21h and on the lower edge 21g is not considered to be critical but is believed to contribute to increased efficiency of the unit. And, in this connection the coating to form the absorbent surfaces may be sprayed, brushed, or otherwise applied, although we consider that if the coating is baked onto the panel surfaces a better result may be obtained, both in functioning and in withstanding the conditions encountered in service.

It is to be noted that in the example unit R hereof, the absorbent surface S on the inner side of panel 21 is not extended upwardly over the inner side of the curved upper portion 21a thereof. Such surface is left uncoated so as not to increase its outside temperature. If radiant rays were to impregnate the curved top portion 21a of panel 21 there would result an excess of surface emissivity, thus causing a streaking of the wall above a unit R due to rising heated air.

We have determined that a satisfactory and efficient coating material for forming the absorbent surfaces S may be composed of the following ingredients by weight, namely: carbon black 5%; silica and silicates 16%; resin 8%; vegetable oils 9%; and mineral 62%. We do not, however, intend or desire to limit the absorbent surfaces to formation from the foregoing coating material, as other materials and compositions may be utilized to form the coating surfaces to give the necessary absorbent characteristics for functioning of a generator unit of the invention.

The radiant ray emitting tube unit 50 which is removably mounted in operative combination with the cabinet 20, is comprised in this example of a series of thin-walled, spirally corrugated tubes T formed of a material having high emissivity characteristics, and the intake header IH and discharge header DH connected to opposite ends, respectively, of the tubes T. In the unit R four (4) tubes T are employed, these tubes being referred to generally by the reference character T, and specifically by the reference characters T1, T2, T3, and T4, respectively. In mounted position of the tube unit 50 within the cabinet 20, the tubes are disposed horizontally in generally parallel relationship extending between and connected at their intake ends, in this instance their right hand ends when facing unit R, to the intake header IH, and at their opposite ends, the left hand ends, to the discharge header DH, with the headers being generally vertically disposed transversely of the cabinet. The tubes T are identical and each is comprised of a thin-walled copper tube which has been spirally corrugated and which, in this particular example, has a maximum effective external diameter of approximately ⅞" and a minimum effective internal diameter of approximately ⅝", with a tube wall thickness of preferably the order of .013" to .01". Each of the tubes in the example unit is formed of what is known in the trade as a "rich low brass" composed of 85% copper and 15% zinc. Such alloy material has a very high radiant ray emissivity characteristic, and we have found it of high efficiency as the tube material for the tubes T of a transmitter unit of the form of unit R of this example.

We do not consider the use of tubing of ⅞" outside diameter to be critical and, hence, in disclosing by the present example tubes of such diameter, we do not intend thereby to so limit our invention, as tubes of greater or lesser outside diameters may be utilized if found expedient.

Each of the tubes T is spirally corrugated from end to end thereof to form in effect internal and external "threading" therearound having a lead of 8°, that is to say, having 40 helical channels for each 1' of tube length. The corrugations of each tube T have, in this instance, a depth of approximately ⅛", externally and internally, and a width of approximately 3/16". Each tube T thus formed provides therewithin a continuous, radially outwardly extended spiral or helical channel within the tube from end to end thereof for causing the hot water circulated therethrough to whirl in a vortical or helical path around the interior of the tube.

The corrugations of a tube T increase materially the effective area of radiation of emission of the tube, this area being increased about 50% over the area of a straight wall tube by the tubes T of this example. Thus, by increasing the depth of the corrugations of a tube such area of radiation can be further increased, but whatever the depth of corrugations utilized, the helical channels receive therein the whirling, turbulent fluid in direct contact with the inner surfaces of the corrugated walls. We presently consider that the high emissivity characteristics of our thin-walled corrugated tubes are substantially contributed to by uniformly shaping and spacing the corrugations on the tubes, as in the selected examples hereof.

The efficiency of emission of radiant rays from a tube T appears to be improved by corrugating the tubes in a direction therearound to effect whirling or vortical movement of the water therethrough clockwise in the direction of flow through the tube. With the corrugations so formed it is to be noted that the clockwise direction of whirl or vortical movement of water circulated through the tube will be carried out irrespective of the axial direction of flow, that is, whether the flow is from right to left or left to right through the tube. By forcing the path of whirl in a clockwise direction a decrease in inside wall friction results, causing an advantageous decrease in friction head.

The tubes T of unit 50 are arranged and connected between the headers IH and HD so that the tubes are staggered relative to each other in horizontal and vertical directions. For example, in the unit R of our invention here disclosed, the tube T1 is positioned as the lowermost of the tubes and is extended between the front or forward, lower portions of the headers IH and DH with its outermost side in juxtaposition to the inner surface of the front panel or grill 21. The tube T2 is mounted in horizontally disposed position spaced above but offset rearwardly relative to the lowermost tube T1, so that it is positioned generally parallel with the tube T1 but has its opposite ends connected to rear, intermediate portions of the headers IH and DH, respectively. The next tube T3 upwardly in the series to tubes T, is spaced above tube T2 but is positioned with its longitudinal axis lying in the vertical plane passing through the longitudinal axis of the lowermost tube T1, so that tube T3 is spaced forwardly from tube T2 and has its opposite ends connected to the headers IH and DH at the forward upper portions of those headers, respectively. The uppermost tube T4 is spaced above and rearwardly from the adjacent tube T3, in position with its longitudinal axis lying in the vertical plane of the longitudinal axis of the tube T2, so that tube T4 is connected at its opposite ends in the upper rear portions, respectively, of the inner sides of headers IH and DH. In this particular example, this relative positioning and staggering of adjacent tubes T is such that in the assembly thereof with headers IH and DH, the rearmost inner sides of tubes T1 and T3 lie in, or in immediate proximity to, the vertical plane passing through the outermost sides of the rearwardly staggered or spaced tubes T2 and T4.

The intake header IH and the discharge header DH are identical in construction, except for positional reversal of components to adapt the headers for mounting in connection with the left hand ends and the right hand ends, respectively, of the tubes T. Referring now to Figs. 6, 7, 8 and 13, and to the intake header IH therein disclosed, this header is formed by a bronze casting providing a hollow casing 60 comprised of the outer side wall 60a, inner side wall 60b, front wall 60c, rear wall 60d, bottom wall 60e and top wall 60h. At the lower side of outer wall 60a there is cast integrally therewith a hot water intake 61 which has an axial bore or passage 61a therethrough providing at the inner end thereof the inlet port 61b opening into the chamber formed within casing 60. At its outer end bore 61a opens into a counterbore 61c which is internally threaded to receive the external threading on the union or coupling member 14a of the flexible intake tube or riser 14.

On the inner wall 60b of header casing 60 there are cast integrally therewith the jet tubes or nozzles N1, N2, N3 and N4 which project outwardly therefrom at the exterior thereof. Each of these nozzles is identical and includes a tube 62 having a bore or passage 63 therethrough which, in this instance, is of substantially constant internal diameter from end to end thereof. Each tube 62 is surrounded by an annular flange or ring 64 case integrally with wall 60b and being concentric therewith but spaced therefrom to form an annular groove 65 around the tube. The depth or axial width of a flange or ring 64 is less than the projected length of the tube 62 which it surrounds, so that the tube projects a distance outwardly beyond the plane of the outer edge of the flange.

The jet tube or nozzle N1 is positioned at the lower forward end of wall 60b in position to receive thereover the right hand end of lowermost tube T1; the tube or nozzle N2 is positioned on wall 60b above but spaced inwardly thereon relative to jet tube N1, for receiving thereon the right hand end of tube T2; the jet tube N3 is located in position on wall 60b spaced above but offset forwardly from jet tube N2 in position with its longitudinal axis lying in the vertical plane passing through the axis of tube N1 therebelow, for receiving thereon the end of tube T3; and the jet tube or nozzles N4 is located on the upper rear portion of inner wall 60b in position spaced above but offset inwardly from jet tube N3 with its longitudinal axis lying in the vertical plane passing through the axis of jet tube N2, for receiving thereon the right hand end of the uppermost tube T4.

The discharge header DH is as referred to above, identical with the intake header IH, although as will be referred to hereinafter, header DH may function as an intake header and header IH may function as a discharge header if it should be desired to circulate the hot water through the tube unit 50 from left to right, instead of right to left. Header DH includes the jet tubes or nozzles J1, J2, J3 and J4 which correspond in mounted position of header DH to and are axially aligned with the jet tubes or nozzles N1, N2, N3 and N4, respectively, of the header IH. The casing structure of discharge header DH is identical with the casing 60 of intake header IH, and includes at the inner wall 60b thereof, the annular flanges or rings 64 providing the annular grooves 65 around the jet tubes J1, J2, J3 and J4, respectively, for receiving thereon the left hand ends of tubes T1, T2, T3 and T4, respectively, in assembled positions of the tubes and headers. The discharge header DH also includes extended from the outer side wall 60a thereof, the discharge 61, which is of identical construction with the intake 61 of header IH, for connection into the threaded bore 61c thereof, of the coupling or union 15a of the flexible return tube 15 which connects the tube unit 50 into the hot water system. In this example, the right hand ends of tubes T1, T2, T3 and T4 are fitted over the jet tubes or nozzles N1, N2, N3 and N4 in positions received in the annular grooves 65 provided around the jet tubes. These ends of the tubes are then permanently attached and secured in such positions by brazing or in any other suitable manner to form a leak-proof joint and connection between the jet tubes and the transmitter tubes. Thus connected, it will be noted that the internal diameter of the jet tubes is less than the minimum effective internal diameter of the thin-walled corrugated transmitter tubes which are respectively connected therewith, so that the water is discharged initially into the tubes by an injector or jet action and with considerable resulting turbulence. The left hand ends of the transmitter tubes T1, T2, T3 and T4 are connected on and to the tubes J1, J2, J3 and J4, respectively, of the discharge header DH, in the same manner as that described in connection with the attachment of the right hand or intake ends of transmitter tubes T1, T2, T3 and T4 to the jet tubes or nozzles of the intake header IH. With the discharge header DH functioning as such, the tubes J1, J2, J3 and J4 thereof function as discharge or return flow tubes by which hot water is discharged from tubes T into the manifold chamber within header DH for return therefrom to the system through the flexible return flow tube 15.

We have provided each of the headers IH and DH with an arrangement of baffles and flow controlling surfaces within the inner or manifold chamber of the header, by which an efficient control of the velocity of flow and an equalized distribution of the hot water through a header is obtained. The construction and arrangement of the baffles and flow distribution control surfaces for each of the headers IH and DH is the same, except for the positional reversal thereof in one header relative to the other. The flow paths through the headers IH and DH are schematically indicated in Figs. 6, 7, 8, 13, 14 and 15, to which detailed reference will be made hereinafter.

The baffle and flow distribution control surface arrangement of the invention as expressed in the header IH, includes a baffle plate 70 cast integrally with the rear wall 60d and the inner wall 60b of casing 60. Baffle plate 70 is positioned extended at a downward inclination from the inner side of wall 60b at a location thereon spaced above jet tube N1 and below tube N2. Baffle 70 extends downwardly across and is spaced outwardly from the intake port 61b and terminates with its lower edge spaced a distance above the lower or bottom wall 60e of casing 60, to thus form a flow passage between wall 60e and the lower edge of the baffle. This baffle 70 has a width less than the width of the inner chamber of the header, so that the inner, free vertical edge of the baffle is spaced a distance outwardly from the inner side of rear wall 60d to a flow passage between the baffle and such rear wall. In this example, the baffle plate 70 has a width that is approximately one-half (½) of the width of the inner chamber of the header at the location therein of the baffle. The jet tube N1 is positioned with its intake end directly opposite and in line with the inlet port 61b of the header, and the baffle 70 which is located in position interposed between port 61b and the inlet of tube N1, functions to retard the velocity of flow of the hot water through the jet tube N1 as well as to effect a predetermined, controlled distribution of flow of water from port 61b through the inner chamber of the header. It is to be noted that the outer surface 70a of the baffle plate 70 is of flat, planar form so as to function as a deflecting surface for directing that portion of the volume of water which strikes thereagainst from port 61b, upwardly and outwardly across the header chamber to the outer wall 60a of the casing.

The outer wall 60a of casing 60 intermediate the intake 61a and the top wall 60f is formed with a re-entrant portion 71 disposed horizontally and extended transversely thereacross, of a general V-shape in cross section. This baffle portion 71 provides within the header the upwardly and outwardly inclined baffle surface 72 opposite and facing the intake end of jet tube N3. This re-entrant portion 71 of outer wall 60a also provides at its lower side the downwardly and outwardly inclined flow directing surface 73 which may be formed on a radius to provide such surface as slightly convex along a path extending from the re-entrant portion downwardly to the upper side of intake 61. This surface 73 cooperates with the inner, planar surface 70a of baffle plate 70 to control flow and distribution upwardly of the hot water from port 61b to the jet tubes N2 and N3.

The upper portion 74 of the front wall 60c is sloped or inclined upwardly and inwardly from a location adjacent the upper side of flange 64 of jet tube N3 to the top wall 60f with which it merges at a location generally in the plane passing through the upper side of the flange 64 which surrounds jet tube N4. This inclined portion 74 of front wall 60c thus provides at the inner side thereof the upwardly and inwardly inclined baffle or flow distribu-tion surface 75 which lies in a plane which if projected upwardly will pass upper jet tube N4 spaced a distance from the upper, front side portion of that tube.

The portion 76 of the rear wall 60d is offset inwardly from the plane of the wall 60d, from a location immediately below the plane passing through the lower or under side of jet tube N2, so that the width of the lower portion of the chamber within the header from front to rear is thereby reduced. Wall portion 76 is joined with wall 60d thereabove by an upwardly and outwardly extended shoulder 77.

As a result of this baffle and distribution surface arrangement within the inner chamber of the intake header IH, a velocity flow control and water distribution from inlet port 61b to the intakes of jet tubes N1, N2, N3 and N4, will be effected in general accordance with the schematic indications of the flow paths as shown in Figs. 6, 7, 8, 13, 14 and 15. A portion of the volume of water supplied in the lower end of the header from port 61b will pass below baffle plate 70 to jet tube N1 but the velocity of flow of such volume of water will be retarded and reduced by the baffle. The remainder of the volume of water delivered from port 61b will pass upwardly through the header, but in doing so will be acted upon by the planar surface 70a at the outer side of baffle 70, in such a manner that a portion thereof will be deflected outwardly and upwardly against the under baffle surface 73 of the baffle portion 71, as will be clear by reference to Fig. 6. Thus, a portion of this water will flow into the intake of tube N2, while a portion thereof will be directed by and under the control of baffle surface 73, to the intake of jet tube N3. The volume of water flowing upwardly through the header IH after the supply of the desired volumes to tubes N1, N2 and N3 will be directed and controlled by the upper surface 72 of baffle 71 and the baffle surface 75 at the inner side of the sloping wall 74, upwardly to the uppermost jet tube N4. It will be noted by reference to Fig. 6, that the restriction of the header chamber formed by the baffle portion 71 will deviate the upward direction of flow and surge of the water to an inwardly and upwardly directed path toward the inner wall 60b and the jet tubes N3 and N4 of that wall. By reference to Fig. 6, it will also be noted that at the location indicated by the reference character b, the decreased cavity will insure the delay of the water on return, so as to thereby create and establish a volume of water available for forcing into the intakes of tubes N2 and N3, while the decreased cavity at the location indicated at c, retards the flow of water to insure the required volume thereof for forcing into the intake of tube N1. At the location indicated by the reference character d, the increase of cavity within the header chamber acts as a reservoir to aid in the distribution of water to the intakes of the jet tubes N1, N2, N3 and N4.

Thus, the above described arrangement of baffles and flow directing surfaces insures that a proper volume of water will enter each of the tubes N1, N2, N3 and N4, together with proper regulation of the velocities of flow to this end. In the absence of such baffle and flow directing surface arrangement, or its equivalent, it is not possible to regulate the volume of water supplied to and forced through the jet tubes N2 and N3 and the transmitter tubes T2 and T3 with which they are respectively connected. Also, in the absence of such control and distribution a very high velocity will be created in the jet tubes N1 and N4 and the transmitter tubes T1 and T4 connected therewith, so that jet tubes N2 and N3 and the transmitter tubes T2 and T3 would be "starved," with the creation of a reverse flow in tubes T2 and T3 and the establishment of air pockets which would be difficult to control either mechanically or automatically by venting.

The discharge header DH formed as it is with the baffle flow control surface arrangement of the intake header IH, is operable as either a discharge header or as an intake header. When functioning as an intake header for circulating hot water through unit 50 from the left to the right, the flow distribution therethrough is identical with that hereinabove described in connection with the header IH. However, when functioning as a discharge header, as in the example hereof, the baffle plate 70 of header DH operates in effect as a half-closed gate valve to impede flow and decrease velocity of the water from and through the transmitter tube T1, thus cooperating with the functioning of the baffle 70 of header IH. By thus controlling the flow of water through tube T1, short-circuiting is avoided. The baffle 71 formed by the reentrant portion 70 of header DH functions to create suction at the location indicated in Figs. 6 and 13 by the reference character *e*, to thereby draw or suck water from the tubes T3 and T4. Thus, there is functional cooperation between the headers IH and DH and their identical but reversed position baffle and control surfaces, to the end that there is established and maintained a substantially equal distribution of hot water to the generator tubes T at their intake ends, with a desired velocity and volume of flow through the tubes T to their discharge ends provided by the discharge tubes or nozzles J1, J2, J3 and J4. With the unit R of the example, the capacities of the tubes T in terms of water flow percentages therethrough is found to be approximately as follows, namely: tube T1—100%; tube T2—95%; tube T3—90%; tube T4—90%.

Due to the spirally corrugated, convolute form of each of the tubes T and the jet effect of the inlet tubes or nozzles N1, N2, N3 and N4, a very high rate of emission is obtained from and throughout the length of each of the T tubes. The high emissivity characteristics of which tubes T are formed and the extremely thin walls of the tubes plus the turbulence created by the nozzles and the whirling of the water in tight spiral or vortical paths therethrough utilizes with high efficiency the emissivity characteristics of the tubes and contributes substantially to the efficiency by substantially eliminating the effect of "film coefficient" in the flow of the water through the tubes.

The transmitter tubes T1, T2, T3 and T4 of the tube unit 50 are painted or coated black to provide a black body radiating surface thereover. Such black coating surface may be of the composition hereinbefore given for forming the S on the inner side of front panel, or any other coating material suitable for the purpose. While we do not consider the covering of the T tubes with a black coating to be necessarily critical, yet such coating contributes to increased efficiency of the unit, particularly during the period of forced convective action in the operation thereof. Further, the use of the coating tends to equalize or standardize the heat output of comparable units by eliminating variations in the degrees of brightness or polish of tubes T in different units.

We have provided a structurally simple and efficient arrangement by which the transmitter tube unit 50 may be mounted in operative position within the cabinet 20. In the example hereof, such arrangement comprises the brackets 80 which are identical in design and construction and which are mounted in vertically disposed positions on the rear wall structure 22 of the cabinet spaced apart longitudinally of such rear wall structure. Each of these brackets 80 comprises a simple plate member 81 having a seating flange 82 bent up from and along the rear vertical edge portion of the bracket. Flange 82 has formed therefrom the tongues 83 for engagement and locking in the rear wall section 25 to attach the bracket in mounted position. The plate member 81 in attached position on rear wall section 25 is vertically disposed and extends forwardly to terminate at its most forwardly located edges spaced a distance inwardly from the inner side of the removable front panel or grill 21 of cabinet 20.

The plate member 81 of each tube unit mounting bracket 80 is formed with four (4) vertically spaced recesses 84, 85, 86 and 87 therein and therethrough which open forwardly through the forward edge of the plate member. The lowermost recess 84 of a bracket 80 is positioned in the forward portion of the plate member 81 and is adapted to receive therein the lowermost tube T1 of tube unit 50. The recess 85 is positioned adjacent the rear edge portion of plate member 81, being spaced to the rear and above recess 84. This recess 85 is adapted to receive therein the tube T2 of the tube unit 50. The recess 86 is formed in plate member 81 in position spaced above recess 85 but located in the forward portion of the plate member with its axis intersecting the vertical plane which passes through the axis of the lowermost recess 84. Recess 86 is adapted to receive therein the tube T3 of the tube unit 50. The uppermost recess 87 of plate member 81 is formed in the rear portion of the plate member spaced above recess 86 and being located with its axis passing through the vertical plane which passes through the axis of the recess 85. The recess 87 is adapted to receive therein the tube T4 of tube unit 50.

Each of the recesses 84, 85, 86 and 87 has the edge at the inner side thereof curved or of circular form generated on a radius to seat against the wall between adjacent corrugations of a tube T received in the recess. Such curved or circular edges at the inner sides of the recesses are identified by the reference characters 84*a*, 85*a*, 86*a* and 87*a*, respectively. Passages 84*b*, 85*b*, 86*b* and 87*b*, are formed in the plate member 81 and open at their inner ends into the recesses 84, 85, 86 and 87, respectively. These passages extend forwardly from the recesses through the plate member to and open through the forward edge of that member. Each of the passages has a width slightly less than the external diameter of a tube T between adjacent corrugations of the tubes, so as to form a relatively tight or running fit with a tube when forced through a passage to the recess at the inner end thereof. The outer ends of passages 84*b*, 85*b*, 86*b* and 87*b* which open through the forward edge portions of a plate member 81 are of increased width to provide outwardly diverging, opposite edges for receiving and guiding the tube T into a passage. Preferably, as in the example hereof, the portions of plate 81 at the opposite sides of each of the recesses 84, 85, 86 and 87 and the passages 84*b*, 85*b*, 86*b* and 87*b* therefrom, respectively, are bent laterally and diverged outwardly in opposite directions from the inner sides of the recesses to positions laterally angularly offset from the plane of the body 81 in order to provide for and accommodate the pitch or lead of the corrugations of the tubes T inserted in the passages and seated in the recesses. The lateral offsetting of the portions of the body 81 at opposite sides of the passages and recesses will be clear by reference to Fig. 6 of the drawings.

The tube unit 50 is mounted in the brackets by inserting the tubes T1, T2, T3, and T4 in the passages 84*b*, 85*b*, 86*b* and 87*b* of each bracket 80, and then forcing the tube inwardly through the passages until they "snap" into seated positions received in the bracket recesses 84, 85, 86 and 87, respectively. The tube unit 50 is thus securely held in operative position within the cabinet 20 but may be readily removed from position by simply pulling outwardly on the unit and withdrawing it from the brackets.

The diameters of the recesses 84, 85, 86 and 87 may preferably be a few thousandths of an inch larger than the root diameter of the tubes T1, T2, T3, and T4, received therein, and the tubes when snapped into the recesses will not pull out of the brackets even under the conditions encountered in shipping or in excessive handling. By the offsetting of plate 81 at opposite sides of the recesses the tubes are maintained against freedom of movement during vibrations of the unit. Excessive movement of the tubes against the flat, blanked recesses would result in tube wall wear and ultimately cause leaks in the tubes. It will be also noted that due to the offset radius the tube walls only are bound, while the forward part of each recess prevents outward displacement of a tube from the recess.

If desired or found expedient, as illustrated by the present example, the tube unit 50 may be releasably locked against diplacement or removal from operative position in the brackets 80 by fastening the headers IH and DH to the section or panel 25 of the rear wall structure 22. For instance, referring to Figs. 8 and 15, a machine screw or the like 88 may be extended through a suitable horizontally elongated slot 88a formed through rear wall section 25, and then threaded into a tapped bore 88b provided in the rear wall 60d of the header casing 60.

In order to separate the headers IH and DH from the rear wall structure 22, with particular reference to rear wall panel 25, we provide an asbestos, fibre or similar non-conducting material washer 88w on the fastening screw 88 by which each header is secured to the rear wall panel 25. Each washer 88w is mounted on its fastening screw 88 in position between the header and the rear wall panel 25, thus spacing the header rear wall from the rear wall panel to provide an air space therebetween. By this construction and mounting there is a minimum of heat loss into the cold wall by conduction, and the efficiency of the bright surfaced rear wall structure 22 is maintained by deflecting the radiant rays, thus preventing substantial heat loss by absorption through the cabinet into the cold rear wall.

The lower or under edge 89 of each bracket 80 is inclined forwardly and downwardly to provide in effect an undercut lower edge. This lower edge 89 is so positioned relative to the front panel or grill 21 in mounted position of the latter, that the upwardly tilted or inclined lower flange 21g of front panel 21 may be "snapped" thereover into position engaged thereunder to thus releasably hold the front panel in mounted position.

The overall width horizontally of each bracket 80 and the locations thereon of recesses 84 and 86 is such that with the tube unit 50 in mounted position on the brackets, the forwardly located tubes T1 and T3 thereof will be positioned with their outer sides projected outwardly beyond the brackets in positions for contacting engagement against the inner side of the front panel 21 when the latter is in mounted position closing the cabinet. By this arrangement we obtain direct conduction from tubes T1 and T3 to and throughout the entire face of front panel 21 to thus increase the areas of direct conduction in a unit R. This direct conduction also assists the radiant energy output from front panel 21 as well as inducing convective action.

The mounting arrangement for the tube unit 50 which includes the spaced brackets 80, provides what is in effect a "floating" mounting or suspension for the tube unit which permits of expansion and contraction of the tubes T without rigid constraint by either the header IH or DH. Such freedom of expansion and contraction is due to the corrugated formation of the thin-walled tubes, and to the fact that the brackets 80 have a certain degree of yield or spring laterally. By thus eliminating rigid constraint upon expansion and contraction and providing the non-rigid "slip" engagement of the tubes in the bracket recesses, the objectionable noises caused by expansion and contraction are substantially eliminated so that extremely quiet operation of a unit R results.

It is usually preferable that means be provided for venting air from the system of our invention in which the transmitter tube units R form components. Hence, we have provided each of the headers IH and DH of a unit R with a vertical tapped bore through the upper wall 60f thereof for the purpose of threading thereinto either an automatic or manual air vent valve 90 or a closing plug 91. In the example here given each discharge header DH is provided with an automatic air vent valve 90, while each intake header of unit R has the tapped bore in the top well thereof closed by a plug 91.

*System and transmitter unit functioning*

The system and the radiant heating unit or units R thereof of this example are designed to utilize hot water as the fluid heating medium for the system. Referring to Fig. 1 of the drawings, hot water is circulated under the action of the circulating pump P from the boiler B, through section 11, into the hot water line 10 to and through a unit or units R connected therein as hereinbefore described, and back to the boiler through the return section 12. In this particular system there is thus provided a closed hot water circuit in which are included a unit or units R.

A summary of the functioning of but one unit R in the system will now be described and will serve as a description of the functioning of each of such units R which may be included in the system. When the system starts operation, say with the unit R and the room which it is to warm at cool or cold temperature conditions, as soon as the hot water from boiler B reaches unit R and is circulated through the transmitter tubes T thereof, there will be instantaneous transmission of heat from the surfaces of these tubes without any appreciable thermal lag. This is so because of the very thin copper walls of the tubes T and the spiral corrugations thereof, together with the turbulence established by the nozzle tubes N1, N2, N3 and N4 and the vortical flow of the hot water through the tubes. The whirling or vortical flow of the hot water through these thin-walled tubes and the turbulence in the flow, destroys the film coefficient, so that the outside walls have a greater surface temperature with resulting increase in emission and strength of the radiant rays projected from the tubes. With the instantaneous transmission of heat from the walls of the tubes T within the cabinet 20, there will be created immediately a heating of the air within the cabinet. This heated air moves rapidly upwardly through the cabinet and discharges at relatively high velocity from the cabinet through the louvers L, outwardly and upwardly into the air in the room. Cool air from the lower floor level area of the room flows into the cabinet through the air intake opening 21d across the lower portion of the cabinet at floor level, to displace the heated air discharged from the cabinet. The cooler air is forced rapidly upwardly through the cabinet over and around the tubes T therein and is thus heated to rise and discharge from the cabinet. The staggered arrangement of tubes T eliminates blanketing of one tube by an adjacent tube and increases the "scrubbing" action of the air on the tubes. In this manner a high velocity convection circulation of air upwardly through the cabinet from the lower portion of the room to the air in the upper portion thereof is established.

With the initiation of the heating operation and simultaneously with the establishment of the convection circulation through the cabinet 20 of the unit R, the tubes T of the unit will emit and project strong radiant rays therefrom in a concentration over and across the floor of the room at the floor level. This ray emission starts in substantially full powered output substantially instantaneously with the arrival into the passage through the tubes T of the hot water at the initiation of the heating operations. This is so because of the very thin walls of the tubes and the high emissivity characteristics of the material of which they are formed augmented by the corrugations or convolutions of this tube. There is thus projected a concentration of strong rays across the room at floor level which results in the establishment of a blanket of heat at that level. As this heating of the air in the room at floor level progresses there will be a reduction in the temperature differentials between the air at floor level and the warmer air being discharged into the room from the unit R at upper levels, so that there will be a dampening or reduction in the velocity of flow of the air from the lower level into the heater which in turn will reduce the strength and velocity of the convective circulation to a circulation of gentle, low velocity character. When the temperature conditions in the room approach a condition of balance, then thereafter there will be maintained by the heating unit R a condition in which the radiant heat supplied to the room and the convective heat supplied thereto will be in a condition of substantial equilibrium or balance and there will be maintained automatically throughout the heating operations, a low velocity heat transmitting convection circulation of air from the floor level, through the unit R into the air in the upper portions of the room together with the projection of radiant rays through the room with the transmission of heat thereto by radiation.

It is to be particularly noted that in a radiant heating unit R of our invention, utilizing the thin-walled, high emissivity material tubes T of spirally corrugated form, there is mainly provided thereby a primary heat transmitting area with substantially no secondary transmitting area which is a major factor in the creation and maintenance of the low velocity convection circulation which replaces and follows automatically the initial, starting period of high velocity circulation as described above. In terms of the average installation for room heating under average conditions, the convective heat transmitted by a unit R seldom will rise over 90° F. in temperature. At this relatively low temperature this air after discharge from the unit R will rise very slowly through the room toward the ceiling, and as it rises it will be quickly absorbed by dissipation or diffusion into the cooler air of the room before it reaches the ceiling itself. While this convective heat is being absorbed into the upper levels of the room, the radiant energy from a unit R floods the lower area and will bring the objects against which it strikes by resulting heat transfer thereto, up to the room temperature. Similarly, whatever radiant rays from the unit R strike the upper walls will transfer heat thereto to stop or reduce the cold wall drafts therealong and thereover.

In the operation of the unit there will also be heat transmission to the air in the room through conduction and the heat so transmitted to the room will be balanced and in a substantial equilibrium with the heat transmitted by radiation and the heat transmitted by convection. The transmission of conductive heat by a unit R is, due to the design and construction of the unit and its mounting location in a room, so correlated with the radiant heat and the convective heat that the substantial balance between the latter by which the mild, low velocity convection circulation and the radiant heat combine to maintain a substantially uniform temperature condition through the room will not be disturbed and unbalanced. For instance, it has been found with the average installation operating under an average range of temperatures that there can be maintained within a room heated by a unit or units R, a substantially constant uniformity of temperature varying only within a few degrees, that is to say, 3° to 5° F., over the entire room.

As hereinbefore pointed out, a very efficient radiant ray emission is effected by the transmitter tubes T due to the construction and to the mounting of the tubes and to their functional relationship with the cabinet and the convective circulation of air therethrough. The cabinet 20 functions to efficiently utilize with a minimum loss, the radiant rays emitted by the tubes and to project and to effectively distribute such rays into and through a room. Radiant rays are projected forwardly and outwardly from tubes T and are quickly absorbed through the coating S on the inside of the front panel. This effects a thermal conductivity through the front panel which in turn releases this thermal energy into radiant energy. Such radiant energy is projected directly across the room in a concentration along and over the floor of the room at the floor level to establish a blanket of warm air, as referred to hereinabove. Rays projected directly rearwardly from around the tubes T strike against the bright metal or polished surfaces presented by the inner side areas of rear wall panels 25, 27, 31 and 33. These surfaces reflect and project the rays forwardly through the cabinet and through the front panel, such rays thus being added to and augmenting the rays being directly forwardly projected from the tubes T. Depending on the angle of projection from the upper transmitter tube T4, the upwardly and forwardly inclined reflecting surface 28 of rear wall panel 27 will project rays from that tube both forwardly and downwardly and forwardly and upwardly through the room. Rays projected upwardly and forwardly from the tube T4 will pass by surface 28 and be projected directly upwardly into the upper portion of the room and against the ceiling thereof. Depending upon the angle of projection from the lower tube T1, the lower, forwardly and downwardly inclined reflecting surface of rear wall panel 31 and the reflecting surface 34 of bottom wall 33, will reflect the rays striking thereagainst forwardly and outwardly into the room at the corresponding angles outwardly and upwardly, from and through an area directly over the floor of the room upwardly to angles of the order of 45°. There is thus utilized to substantially maximum efficiency and with minimum loss, the full power and effect of the radiant rays emitted by the tube unit 50 within the cabinet 20.

The use of the flexible tubes for the supply or riser 14 and for the return 15 of a heating unit R constitutes a feature of considerable advantage in the installation and maintenance of a unit of our invention. Such flexible tube connectors permit of a heating unit being permanently installed into the hot water system prior to plastering for temporary heating during plastering. This may be accomplished by removing the front grill or panel 21 and placing the unit directly upon the floor and then securing the unit below the wood ground so as not to interfere with the plaster application. After the plaster is fully dried, the flexible connectors allow the cabinet to be raised up to the wood ground without the necessity of drawing the hot water system or disconnecting the risers. Further, by the use of these flexible connectors of proper lengths, the time and labor required in the measuring and cutting to accurate lengths of rigid pipe connections are eliminated.

While we have shown a heating unit of our invention in a preferred form as designed and intended for mounting in a room as a base-panel unit, we do not by this disclosure intend or desire to limit every feature of design, construction or operation to use in such baseboard-panel type of heating unit. We contemplate and include units embodying features of our invention for mounting at other locations in a room either in the general form of our herein disclosed base-panel unit, or in forms especially designed for any such other mounting location or locations.

It will also be evident that various other embodiments, mechanical expressions, constructions, combinations, and sub-combinations may be resorted to without departing from the broad spirit and scope of our invention, and hence, we do not desire to limit and restrict our invention in all respects to the exact and specific disclosures hereof as illustrated and described herein by way of example, except as may be required by specific intended limitation thereto in any of the appending claims.

What we claim is:

1. In a radiant heating unit, in combination, a heating fluid inlet header; a heating fluid discharge header positioned spaced from said inlet header; a plurality of nozzle tubes projecting outwardly from the opposite facing sides of said headers, respectively, said nozzle tubes on each of said headers being spaced apart and being in substantial axial alignment with the nozzle tubes, respectively, of the other of said headers; thin-walled spirally corrugated heating fluid circulating tubes mounted in position in general parallelism extending between and connecting said headers with the opposite ends of each of said circulating tubes being mounted over and receiving therein aligned nozzle tubes of said headers; and each of said headers comprising a casing having front, rear, inner side, outer side, and opposite end walls forming a fluid distributing chamber therewithin; said outer wall adjacent one end thereof having a fluid passage transversely therethrough; a baffle plate at the inner side of said inner wall within said chamber extended at an inclination inwardly from said inner wall across and spaced from the end of the nozzle tube opposite said fluid passage, said baffle plate having a width less than the width of the chamber within said casing and at its outer end being spaced from the adjacent end wall of the casing; the outer wall of said casing being formed with an inwardly extended baffle disposed therewithin and being extended transversely thereacross intermediate the opposite end walls of said casing, said transversely disposed baffle providing oppositely inclined baffle surfaces at the inner sides thereof facing the opposite end walls, respectively, of said casing; and the end portion of said front wall at the end of said casing opposite said fluid passage being inclined outwardly and inwardly to and being joined with the end wall adjacent thereto to provide at the inner side thereof an inwardly and outwardly inclined fluid flow directing surface.

2. A radiant ray-emitting tube unit for a radiant heater, comprising in combination, a heating fluid inlet header; a heating fluid discharge header spaced from said inlet header; a plurality of nozzle tubes projecting outwardly from the inner facing sides of said headers; said nozzle tubes on each of said headers being spaced apart and being in substantial axial alignment with the nozzle tubes, respectively, of the other of said headers; thin-walled spirally corrugated heating fluid circulating tubes mounted in position extending between and connecting said headers with the opposite ends of each of said circulating tubes being mounted on and in communication with aligned nozzle tubes of said headers; and each of said headers comprising a casing having front, rear, inner side, outer side, and opposite end walls forming a fluid distributing chamber therewithin, said outer wall adjacent one end thereof having a fluid passage transversely therethrough opening into said fluid distributing chamber; said nozzle tubes at the outer ends thereof opening into said fluid distributing chamber and projecting outwardly from the inner side wall of said casing at locations spaced apart longitudinally thereof; a baffle plate at the inner side of said inner wall of said distributing chamber extended at an inclination inwardly across and spaced from the inner end of the nozzle tube that is opposite said fluid passage through the outer wall of said header casing, said baffle plate having a width less than the width of the fluid distributing chamber within said casing and at its outer end being spaced from the adjacent end wall of the casing; the outer wall of said casing being formed with an inwardly extending baffle extending transversely thereacross intermediate the opposite end walls of said casing; and the end portion of said front wall at the end of said casing opposite said fluid passage being inclined outwardly and inwardly to and being joined with the end wall adjacent thereto to provide at the inner side thereof an inwardly and outwardly inclined fluid flow directing surface.

3. In a radiant heating unit, in combination, a heating fluid inlet header; a heating fluid discharge header positioned spaced from said inlet header; said headers being provided through the opposite facing inner side walls thereof, respectively, with a plurality of spaced apart tube passages transversely therethrough with the tube passages of each header wall opposite and aligned with the tube passages, respectively, of the opposite header inner side wall; thin walled spirally corrugated heating fluid circulating tubes mounted in position in general parallelism extending between and connecting said headers with the opposite ends of each of said circulating tubes being connected in communication with aligned tube passages in said opposite headers, respectively; and each of said headers comprising a casing having front, rear, inner side, outer side, and opposite end walls forming a fluid distributing chamber therebetween within said casing; said outer wall adjacent one end thereof having a fluid passage transversely therethrough; a baffle plate at the inner side of said inner wall within said chamber extending at an inclination inwardly from said inner wall across and spaced from the end of the tube passage opposite said fluid passage; said baffle plate having a width less than the width of the chamber within said casing and at its outer end being spaced from the adjacent end wall of the casing; said outer wall of said casing being formed with an inwardly extending baffle disposed therewithin and being extended transversely thereacross intermediate the opposite end walls of said casing; and the end portion of said front wall at the end of said casing opposite said fluid passage being inclined outwardly and inwardly to and being joined with the end wall adjacent thereto to provide at the inner side thereof a fluid flow directing surface.

References Cited in the file of this patent

UNITED STATES PATENTS

| Number | Name | Date |
|---|---|---|
| 419,366 | Shackleton | Jan. 14, 1890 |
| 514,338 | Row | Feb. 6, 1894 |
| 1,563,562 | Gasser | Dec. 1, 1925 |
| 1,678,791 | Schram | July 31, 1928 |
| 1,776,080 | Murray | Sept. 16, 1930 |
| 1,853,189 | Bancel | Apr. 12, 1932 |
| 1,874,940 | Dwyer | Aug. 30, 1932 |
| 1,907,527 | Erskine | May 9, 1933 |
| 2,036,961 | Collier | Apr. 7, 1936 |
| 2,209,304 | Alder | July 30, 1940 |
| 2,241,864 | Maier | May 13, 1941 |
| 2,243,931 | Webster | June 3, 1941 |
| 2,477,824 | Reiss | Aug. 2, 1949 |
| 2,500,642 | Morse et al. | Mar. 14, 1950 |
| 2,568,818 | O'Day | Sept. 25, 1951 |
| 2,621,900 | Borg | Dec. 16, 1952 |

FOREIGN PATENTS

| Number | Country | Date |
|---|---|---|
| 115,481 | Australia | July 19, 1941 |
| 531,395 | Great Britain | Jan. 3, 1941 |